United States Patent Office 3,454,507
Patented July 8, 1969

3,454,507
METHOD OF FOAMING A VINYL CHLORIDE POLYMER
David Jankiel Wluka, East St. Kilda, Victoria, Australia, assignor to Imperial Chemical Industries of Australia and New Zealand Limited, Melbourne, Victoria, Australia, a corporation of Australia
No Drawing. Filed Oct. 17, 1966, Ser. No. 586,974
Int. Cl. C08f 47/08, 29/44
U.S. Cl. 260—2.5    6 Claims

ABSTRACT OF THE DISCLOSURE

Foamed polyvinyl chloride compositions and a process for producing the same which includes foaming a polyvinyl chloride foaming composition in the presence of a pore-size controlling additive which is a copolymer of at least one unsaturated compound A and at least one compound B which, in turn, is a derivative of a mono- or diprotic unsaturated acid. Compound B is a copolymerizable with compound A and one or both of compounds A and B carry at least one aliphatic substituent having at least 4 carbon atoms, at least one of compounds A and B carry at least one polyoxyalkylene residue terminated with an alkyl, aryl, aralkyl, alkaryl or acyl group.

---

The present invention relates to new compositions comprising copolymers of polyoxyalkylene derivatives of unsaturated acids and in particular to plastic foaming compositions comprising these copolymers.

Accordingly we provide a new polyvinylchloride based foaming composition comprising a pore-size controlling additive which is a copolymer of at least one unsaturated compound A and a copolymerisable derivative B of a mono- or diprotic unsaturated acid, at least one of which compounds A and B comprises one or more aliphatic substituent having 4 or more carbon atoms and at least one of which compounds A and B comprises one or more polyoxyalkylene residues terminated by an alkyl, aryl, aralkyl or acyl group.

The compound A may be represented by the formula $$R^4.C.R^2$$
$$R^3.C.Y_a^1-G_b^1-R^1$$   (Formula A)

In Formula A, indices $a$ and $b$, which may be the same or different, are 0 or 1; $Y^1$ which may be present (when $a=1$) or absent (when $a=0$) is an alkylene bridge; —$G^1$— which may be present (when $b=1$) or absent (when $b=0$) is —O—, $$\overset{O}{\underset{}{C}}\overset{}{\underset{}{C}}-,\ -\overset{O}{\underset{}{C}}-O-,\ -\overset{O}{\underset{}{C}}-NR^5-,\ \overset{O}{\underset{O}{S}}-O-,\ -O-\overset{O}{\underset{\diagdown O-}{P\diagup OR^5}},\ -P\overset{OR^5}{\underset{\diagdown O-}{\diagup}}$$

$R^2$, $R^3$ and $R^4$, which may be the same or different and at least one of which is hydrogen, and not more than one of which is aryl or cycloalkyl, stand for hydrogen or a hydrocarbon radical. In addition, whenever —$G^1R^1$ stands for $$-\overset{O}{\underset{}{C}}-OR^1 \text{ or } -\overset{O}{\underset{}{C}}-NR^5R^1$$

$R^2$ may also stand for $$-Y_c^2-\overset{O}{\underset{}{C}}-OR^6 \text{ or } Y_c^2-\overset{O}{\underset{}{C}}-NR^5R^7$$

and whenever $a=0$ and —$G^1R^1$ stands for $$-\overset{O}{\underset{}{C}}-NR^5R^1$$

$R^2$ may also stand for $$-\overset{O}{\underset{}{C}}$$

and $R^5$ then stands for a direct bond to the latter thus forming an imide of a dicarboxylic acid having the formula $$\begin{array}{c} R^3 \quad R^4 \\ | \quad\quad | \\ C = C \\ | \quad\quad | \\ CO \quad CO \\ \diagdown N \diagup \\ | \\ R^1 \end{array}$$

$Y^2$ is an alkylene bridge and index $c$ is 0 or 1. Furthermore whenever $R^2$ and $R^4$ stand for hydrogen, $R^3$ may also stand for —$CH_2CONR^8R^9$ or —$CH_2COOR^9$. $R^1$, $R^5$, $R^6$, $R^7$, $R^8$ and $R^9$, which may be the same or different, are hydrocarbon radicals. Each hydrocarbon radical is selected from the group consisting of alkyl, alkenyl, cycloalkyl, aryl, alkaryl and aralkyl; they are illustrated by radicals such as methyl, ethyl, isopropyl, 2-ethylhexyl, cyclohexyl, hexyl, allyl, hexenyl, phenyl, benzyl, phenylethyl, naphthyl, tertiary butyl, etc. Preferred $G^1R^1$ is $$-\overset{O}{\underset{}{C}}-OR^1$$

preferred $Y^1$ is —$CH_2$—; preferably at least one hydrocarbon $R^1$, $R^5$, $R^6$, $R^7$, $R^8$ or $R^9$ is a long chain alkyl group which is defined as a group comprising at least 4, more preferably at least 8 and most preferably at least 12 carbon atoms; preferred $R^2$, $R^3$ and $R^4$ are hydrogen or alkyl groups having 1 to 3 carbons.

Suitable monomers comprising at least one preferred long chain alkyl group are e.g.

OLEFINES hexene-1
octene-1
decene-1
diisobutene-1
dodecene-1
hexadecene-1
octadecene-1
3-phenylhexadecene-1
p-octylstyrene
2-hexadecylbutadiene-1,3

ETHERS allyl 4,4,8,8-tetramethyldocosyl ether
methallyl octadecyl ether
isopropenyl dodecyl ether
dodecyl vinyl ether
cetyl vinyl ether
1-eicosenyl decyl ether
vinyl p-octylphenyl ether
1-decenyl p-cetylphenyl ether

ESTERS vinyl butyrate
vinyl 2-ethylhexanoate
vinyl palmitate
vinyl oleate
allyl oleate
allyl palmitate
allyl stearate
allyl esters of lard acids
methallyl palmitate
cyclohexyl 2-dodecenoate
p-isoamylphenyl 2-hexadecenoate
4-p-butyltolyl 2-octadecenoate
5-ethyldocosyl crotonate
octadecyl isocrotonate n-butyl-2-eicosenoate
p-tert. amylphenyl octadecyl maleate
p-hexadecylphenyl 2-ethyl-hexyl maleate
o-tolyl 2-octadecylcyclohexyl maleate
o-nonylphenyl-hexadecyl maleate
dihexadecyl maleate
n-butyl acrylate
lauryl acrylate
stearyl acrylate
dodecyl acrylate
dihexyl fumarate
dioctyl fumarate
di-dodecyl maleate
di-dodecyl mesaconate
di-dodecyl citraconate
benzyl octadecyl itaconate
di-hexadecyl itaconate
isopropenyl palmitoleate
1-decenyl laurate
1-hexadecenyl myristate allyl lauryl prop-2-enyl phosphonate The copolymerisable derivative B of a mono- or diprotic, unsaturated acid may be presented by the formula:

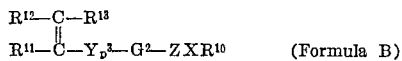

In formula B, $G^2$ is

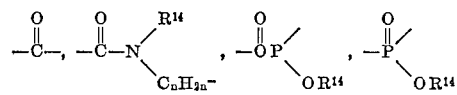

or

Whenever $-G^2-$ stands for $-\overset{O}{\underset{\|}{C}}-$ or

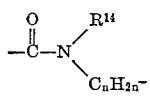

R13 may also stand for

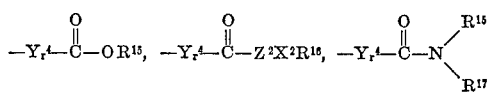

or

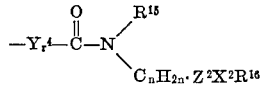

furthermore when $-Y_p{}^3- G^2$ stands for

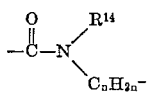

may be

and $R^{14}$ is then a direct bond linking the latter to form a cyclic imide of the formula

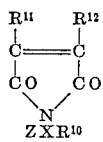

Indices $p$ and $r$, which may be the same or different, are 0 or 1, i.e. $Y^3$ and $Y^4$ may be absent or present; index $n$ is an integer from 1 to 5, e.g. two or three; $Y^3$ and $Y^4$, which may be the same or different, are alkylene bridges; Z and $Z^2$, which may be the same or different, are polyoxyalkylene residues $(OC_mH_{2m})_q$ more closely defined below, each of which may be a linear or branched homopolymer, a random copolymer or a block copolymer optionally modified by grafting a polyvinyl ester or polymethacrylic ester homopolymer or copolymer onto said polyoxyalkylene residue. X and $X^2$, which may be the same or different, stand for $-O-$ or $-NR^{18}-$; $R^{14}$, $R^{15}$, $R^{17}$, $R^{18}$, $R^{19}$ and $R^{20}$, which may be the same or different, are hydrocarbon radicals; $R^{11}$, $R^{12}$ and $R^{13}$, which may be the same or different, are hydrogen or hycarbon radicals, provided however that at least one of them is hydrogen and not more than one of them is aryl or cycloalkyl; $R^{10}$ and $R^{16}$ are alkyl, aryl, cycloalkyl, aralkyl, alkaryl, or acyl groups and whenever $R^{12}$ and $R^{13}$ and are hydrogen, $R^{11}$ may also be $-CH_2COOR^{19}$, $-CH_2 \cdot CONR^{19}R^{20}$, $-CH_2 \cdot COOZ^2X^2R^{16}$ or

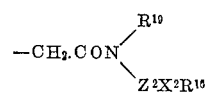

Preferred hydrocarbon radicals are the $C_1$ to $C_3$ alkyl radicals; preferred group $R^{12}$ is hydrogen and preferred $R^{11}$ is hydrogen or methyl, preferred $G^2$ is

and $Y^3$ is preferably $-CH_2-$ or absent.

For any combination of co-mers A and B at least one of the hydrocarbon radicals $R^1$, $R^5$, $R^6$, $R^7$, $R^8$, $R^9$, $R^{10}$, $R^{14}$, $R^{15}$, $R^{17}$, $R^{18}$, $R^{19}$, and $R^{20}$ must be a long chain alkyl radical as above defined. While the presence of at least one such long chain alkyl group is essential to our invention in that it imparts the non-polar properties to the copolymers, the choice of the other radicals, of $G^1$ and of the optional alkylene bridges $Y^1$ and $Y^2$ is not highly critical; it is largely a matter of convenience; thus certain of the compounds within the scope of Formulae A and B are operative but less readily synthesised and/or polymerised while others are commercially available monomers.

The $-XR^{10}$ group may be for example an alkoxy radical such as methoxy, ethoxy, propoxy, butoxy, octyloxy, octadecyloxy; a cycloalkoxy or arylalkoxy radical such as cyclohexyloxy, benzyloxy; an aryloxy radical such as phenoxy; an amine residue such as dimethylamino, diethylamino, phenylmethylamino, morpholino; or a carboxylic acid residue such as acetyloxy, benzoyloxy or an amide residue such as N-methylbenzamido or N-methylacetamido.

Suitable α-β unsaturated monocarboxylic acids from which esters containing the Z group or the long chain alkyl group $R^1$ may be formed are e.g. acids of the general formula

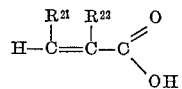

where $R^{21}$ and $R^{22}$, which may be the same or different, are H or an alkyl group having 1 to 4 carbons. Representative acids of this type, any one or more of which can be employed in forming the copolymers, are acrylic, methacrylic, crotonic, tiglic, angelic, α-ethylacrylic, α-methylcrotonic, α-ethylcrotonic, α-propylcrotonic, α-butylcrotonic, hydrosorbic, α-ethylhydrosorbic and α-propylhydrosorbic acids, and the like. A more preferred group of acids for use in the present invention comprises those of the above formula which contain a total of from about 3 to 8 carbon atoms in the molecule, as represented by all except the last-named of the acids listed above. A still more preferred group of acids is made up of acrylic and methacrylic acids.

α-β Unsaturated dicarboxylic acids suitable for making di-esters or -amides or esteramides comprising a long chain alkyl group or a group $-ZXR^{10}$ containing the polyalkylene oxide residue Z as defined include maleic, fumaric, itaconic, citraconic, mesaconic acids. A preferred group of dicarboxylic acids comprises those which contain a total of from about 4 to 8 carbon atoms in the molecule. Still more preferred are maleic acid and fumaric acid.

Suitable proportions of polyoxyalkylene residues range from 15 to 70 percent of the total weight of the copolymeric additive; for best performance the narrower range from 25 to 50% by weight as defined above is preferred; when the polyoxyalkylene group consists of different units ($OC_mH_{2m}$), polyoxyalkylene residues consisting of 50% or more of ethylene oxide units are preferred within the above stated ranges; when the polyoxyalkylene group comprises 70% or more of propylene oxide or butylene oxide units or combinations thereof, it is preferred that the weight of the polyoxyalkylene group is between 40 and 70% of the copolymeric additive. It is understood that within small changes of ratios of the various constituents the improvement in foam properties is gradual and depends also on the specific base polymer ingredients used; hence these limits are not acutely or abruptly critical.

Suitable proportions of the long chain alkyl group range from 10 to 60% and, for best performance, from 20 to 50% by weight of the copolymeric additive.

In practice particularly effective and economic pairs of copolymers A and B are the copolymers of methacrylates and fumarates comprising in each pair at least one long chain alkyl group as defined and an ester of a polyalkyleneglycol group —$ZXR^{10}$ as defined. Other effective and economic combinations are the copolymers of a long chain alkyl ester of acrylic or methacrylic acid (co-mer A) with an acrylic or methacrylic acid ester (co-mer B) of a polyalkyleneglycol group —$ZXR^{10}$ as defined above. The unsaturated acid of the co-mers A and B may be the same or different. As implied above it is not critical whether the ester group —$ZXR^{10}$ is attached to the acid residue of a monocarboxylic or dicarboxylic acid, as long as there is at least one long chain alkyl group present in one of the co-mers; it is even possible to form a mixed ester of a dibasic acid having both the non-polar group and the —$ZXR^{10}$ group attached to one acid molecule.

Optionally our copolymers may comprise copolymerisable mer-units other than those defined in Formulae A and B e.g. ethyl acrylate, methyl methacrylate, ethyl methacrylate, propyl methacrylate, propyl acrylate, vinyl acetate, acrylonitrile, α-olefines including styrene, vinylidene chloride or even vinyl chloride, provided that they do not contain groups reacting with the halide groups of the polyvinyl chloride ingredients in sufficient quantity to cause the decomposition of the polyvinyl chloride. Thus large proportions of amino groups in A, B or C are less preferred. Up to 30 mole percent of the total monomers forming the copolymeric additive may be derived from such co-mers C.

The polyoxyalkylene residues in our copolymers may be linear or branched and comprise —$(OC_mH_{2m})_q$— units, where $q$ is a positive integer, preferably greater than 5, and $m$ is an integer from 1 to 5, preferably 2 to 4.

It is, of course, possible and in some cases may be desirable that $m$ should have different values in the same block. Alkylene groups which may be present include, for example, ethylene, 1,2-propylene, 1,3-propylene, 1,2-butylene and 1,4-butylene. The end of the polyoxyalkylene blocks is formed by the alkylene-oxide-reactive group $R^{10}$. These polyoxyalkylene blocks may be derived from polyoxyalkylene polymers prepared in known manner.

In the case of linear polyoxyalkylene residues Z equals —$(OC_mH_{2m})_q$—. Suitable linear hydroxy-containing polyoxyalkylene polymers may be prepared, for example, by the polymerisation of an alkylene oxide in the presence of a basic catalyst, such as potassium hydroxide, onto a polymer of an unsaturated mono- or di-carboxylic acid or its derivative bearing a group capable of reacting with alkylene oxide, e.g. a carboxyl, a hydroxyl or primary or secondary amine group. Alternatively branched hydroxy-containing polymers containing more than one residue Z may be prepared by the condensation of an alkylene oxide in the presence of a basic catalyst onto a polymer containing co-mer units bearing more than one active hydrogen atom per co-mer unit, e.g. copolymers bearing primary amino and/or polyhydroxy groups such as those derived from ammonia, glycerol, hexanetriol, triethanolamine, pentaerythritol, sorbitol, sucrose and phenolformaldehyde reaction products, amino-alcohols such as monoethanolamine and diethanolamine and polyamines such as ethylene diamine, hexamethylene diamine, diethylene triamine, tolylene diamine and diaminodiphenylmethane. With branched polymers of this type it is preferred that each group Z is terminated by a group $R^{10}$ as defined.

Examples of groups $ZXR^{10}$ are the following compounds containing one hydroxy group. The monomethyl, ethyl, butyl, phenyl ethers of ethylene, diethylene, triethylene or propylene glycols; amino-alcohols such as the N:N-dimethyl, diethyl, phenylmethyl or phenylethyl derivatives of ethanolamine or isopropanolamine, or N-hydroxyethylmorpholine; or hydroxyalkyl esters and amides such as 2-hydroxyethyl benzoate, N-acetyl-N-methyl ethanolamine or N-benzoyl-N-methyl ethanolamine. Examples of monohydric polyether alcohols, which are in general mixtures of products of different molecular weights, include the products of oxyalkylation with ethylene, propylene and butylene oxides or with mixtures thereof, of monohydric alcohols or phenols, secondary amines, carboxylic acids and mono-N-substituted carboxylic amides. Some specific examples of such preferred monohydric polyether alcohols which have been found of value are listed in the table below:

Examples of branched polyoxyalkylene residues are trihydric polyethers of molecular weights up to about 10,000 obtained by oxyalkylation of glycerol, trimethylolpropane, 1:2:6-hexanetriol or pentaerythritol with ethylene oxide, propylene oxide or mixtures of ethylene and propylene oxides; oxyalkylation products from polyhydric phenols such as hydroquinone, resorcinol, 2:2-bis(4-hydroxyphenyl) propane or phloroglucinol; oxypropylated

| Initiator | Alkylene oxide | Molecular weights of derived polyethers |
|---|---|---|
| Methanol | Ethylene oxide | 365, 528, 750 |
| Mixed hexadecyl and octadecyl alcohols | | 368.6 |
| Methyl Cellosolve | | 354, 708 |
| Isooctanol (mixed isomers) | Propylene oxide | 292.4, 372, 419, 629, 980 |
| Triethylene glycol monomethyl ether | | 698, 1,542 |
| Benzyl alcohol | | 410 |
| Isooctanol (mixed isomers) | Butylene oxide (mixed isomers) | 281 |
| Methyl Cellosolve | | 390 |
| n-Butanol | | 332.7, 717, 1,510, 2,255 |
| Isooctanol (mixed isomers) | | 600, 1,023, 1,529, 1,987 |
| Ethyl carbitol (Reg. Trademark) | | 1,023, 1,510, 2,010 |
| Butyl Cellosolve (Reg. Trademark) | Mixture of ethylene and propylene oxides (1:1 by weight) | 1,483 |
| Butyl carbitol | | 698 |
| Benzyl alcohol | | 406 |
| N:N-diethylamino-ethanol | | 624, 1,135, 1,501 |
| Isooctanol (mixed isomers) | Mixture of ethylene and propylene oxides (1:2 by weight) | 1,493 |
| Ethyl carbitol | | 1,533 |
| Isooctanol (mixed isomers) | Mixture of ethylene and propylene oxides (2:1 by weight) | 1,541 |
| Ethyl carbitol | | 1,509 | tolylenediamine of molecular weight about 400; oxyalkylated alkylenediamines where preferably all free hydroxy groups are terminated by $R^{10}$ groups.

The preparation of the copolymers of this invention by methods known "per se" will be apparent to those skilled in the art. Thus, in general two processes of manufacture may be used. One, applicable to many of our compounds, comprises copolymerising a compound of Formula A with a compound of Formula B. The methods of polymerisation, e.g. emulsion or solution polymerisation by a free radical mechanism or a cationic or anionic catalyst are also known from the prior art; the prefered and most convenient method depends on the specific co-mers selected. It is also known that certain mer-units A and B do not copolymerise readily or do so only at low rates. In these cases the difficulty may sometimes by overcome by copolymerisation with a third more readily polymerisable co-mer. Alternatively the second, generally preferable and more convenient process may be used, which comprises copolymerising precursors of the mer-units A and/or B which have reactive groups to form an intermediate copolymer to said reactive groups of which the desired non-polar component $R^1$ and/or the —$ZXR^{10}$ group or groups may be attached by subsequent reactions. Thus e.g. one may first copolymerise a given compound having a non-polar substituent $R^1$ such as an alkyl methacrylate with a suitable acid component such as itaconic acid or maleic anhydride; the resulting polymer is then reacted with a polyalkylene glycol whereby a portion or all of the free —COOH groups in the polymer intermediate become monoester-linked to the polyalkylene glycol. Other possible variations in the nature of the reactants and in the selection of a suitable reaction path would also suggest themselves to those skilled in the art.

Optionally polyvinyl ester or poly(alkyl acrylate) blocks or poly(alkyl methacrylate) blocks may be grafted onto the polyoxyalkylene blocks of our compounds. This may be accomplished by heating a polyoxyalkylene copolymer with a vinyl ester in the presence of a free radical producing catalyst, such as a peroxide, for example a diacyl or diaroyl peroxide, particularly dibenzoyl peroxide or an azo compound, particularly azodi-isobutyronitrile in the manner described by Kahrs and Zimmermann (Makromolekulare Chemie 1961, 58, 75).

It is preferred to carry out the polyoxyalkylation reaction in the presence of a catalyst of the type described in the prior art as effective in this general type of reaction, for example bases, acids, Friedel-Crafts halides, or metallic salts and complexes.

Particularly active catalysts are strong alkalies, especially alkali metal alkoxides such as sodium or potassium methoxide, or an alkali metal derivative of the monohydric alcohol which it is desired to react. Such alkali metal alkoxide catalysts are not, however, always completely satisfactory. This is particularly apparent when making block copolymers from hydrophilic polyesters of high molecular weight of the order of 1500 or higher. In such cases it is difficult, if not impossible, to obtain a homogeneous, single-phase product by the use of an alkoxide catalyst. It has been found that these difficulties may be avoided by using as catalysts certain metal salts, especially metal salts which are soluble in the reaction medium, such as carboxylic acid salts of divalent tin or lead, or of dialkyl tin. Examples of particularly suitable catalysts are stannous octoate, lead octoate and dibutyl tin dilaurate. The use of these preferred catalysts enables the preparation, without difficulty, of homogeneous condensates which are extremely active as surface-active additives for the manufacture of polyvinyl chloride foams. Furthermore, even in those cases where it is possible to make a homogeneous product by use of an alkoxide catalyst, it is frequently found that the use of the afore-described metal salt catalysts provides products which are more active, or more reproducible in their properties as additives for polyvinyl chloride foams, than similar compositions made with an alkoxide catalyst.

The catalysts are normally used in proportions of from 0.05 to 1.0% by weight of the total weight of reactants, although proportions outside this range may be used.

The reaction is normally carried out at temperatures of from 20° to 140° C., depending mainly on the catalyst used. It is usually convenient to carry out the reaction in a solvent, for example an aromatic hydrocarbon or a chlorinated aromatic hydrocarbon.

Certain of the polymers of this invention are new compounds. Our compounds have been found to be particularly valuable as additives in the manufacture of polyvinyl chloride-based foams, wherein they confer an exceptional degree of uniformity of pore size. Thus the use of such additives makes it possible to obtain low density foams with an excellent, uniform pore structure.

Process of producing polyvinyl chloride foams are well known; they are e.g. described in the book "Polyvinyl Chloride Technology" by W. S. Penn, published by Maclaren and Sons Ltd., London, 1962 edition, pages 356–361, chapters 28.3, 28.4, 28.5, 28.6; such processes are: chemical blowing of polyvinyl chloride paste (i.e. plastisols and organosols), pressure blowing of polyvinyl chloride paste, extrusion blowing of solid polyvinyl chloride and even paste or latex whipping. The copolymers of this invention are useful as pore size and viscosity control agents in all of these processes and they are particularly useful for the chemical and pressure blowing of polyvinyl chloride paste. The former has been described, e.g. in E. I. du Pont de Nemours' Technical Service Bulletin BL-353, the latter in British Patents Nos. 767,465, 770,-237, and U.S. Patent No. 2,666,036, all to Elastomer Chemical Corporation.

The copolymers of this invention are incorporated in the mass of the polyvinyl chloride to be foamed, the polyvinyl chloride paste or melt.

Accordingly as a further feature of the present invention there is provided a process for the manufacture of polyvinyl chloride-based cellular materials characterised in that there is incorporated as an additive in said polyvinyl chloride material a copolymer of the present invention. It will be understood that other ingredients conventionally added to polyvinyl chloride foam such as blowing agents, stabilisers, lubricants and viscosity control agents are also added.

By polyvinyl chloride materials we mean polyvinyl chloride polymers or thermoplastic copolymers of vinyl chloride comprising at least 50% by weight of vinyl chloride together with a copolymerisable second vinyl-type monomer. Such co-mers are known e.g. vinylidene chloride, vinyl acetate, methyl methacrylate, higher alkyl acrylates, higher vinyl esters, vinyl ethers and others.

A further advantage of our copolymers is that our copolymers reduce the viscosity of polyvinyl chloride compositions, particularly polyvinyl chloride pastes; this is advantageous when such plastisols are used in processes of spraying, dipping, spreading, e.g. knife-spreading on textile substrates and other processes of coating substrates with polyvinyl chloride pastes. Yet a further advantage is that—in contrast to many surfactants, e.g. the condensation products of alkylphenols with ethylene oxide—they are compatible with the polyvinyl chloride polymer and do not exude or "sweat."

The invention is illustrated but not limited by the following examples in which parts and percentages are by weight.

Example 1

A mixture of 395 parts of light petroleum B.P. 100–120° C. and 395 parts of toluene was stirred and heated under reflux. A solution of 2.5 parts benzoyl peroxide in 8.5 parts butyl methacrylate, 102 parts stearyl methacrylate and 123 parts of the methacrylate of methoxypolyethyleneglycol of molecular weight 320 was added over a period of 5 hours to the refluxing solvent. 0.3 part of benzoyl peroxide was then added, and further quantities of 0.3 part were added after 2 hours and 5 hours respectively. Heating was continued for a further 3 hours. The solvents were removed under reduced pressure. There was thus obtained a copolymer of the composition indicated in Table 1.

Example 2

135 parts of stearyl methacrylate, 82 parts of the methacrylate of methoxypolyethyleneglycol of molecular weight 320, and 28.4 parts of butyl methacrylate were copolymerised in the presence of 3.3 parts of benzoyl peroxide under operating conditions similar to those used for making the polymer of Example 1 but only two additions of benzoyl peroxide, each of 0.3 part were made. The solvents were again stripped from the polymer under reduced pressure. There was thus obtained a copolymer of the composition indicated in Table 1.

Example 3

A solvent free copolymer of 67.5 parts of stearyl methacrylate, 28.4 parts of butyl methacrylate and 164 parts of methacrylate of methoxypolyethyleneglycol of molecular weight 320 was prepared as described in Example 1. There was thus obtained a copolymer of the composition indicated in Table 1.

Example 4

94 parts of the methoxypolyethyleneglycol methacrylate described above, 94 parts of lauryl methacrylate and 15 parts of ethyl acrylate were copolymerised with the aid of 4 parts of benzoyl peroxide as described in Example 3. The addition of monomers again took 5 hours but no further peroxide was added and heating was continued for a further 10 hours. There was thus obtained a copolymer of the composition indicated in Table 1.

Example 5

100 parts of 2-ethylhexyl acrylate, 10 parts of ethyl acrylate, 100 parts of the polyethyleneglycol methacrylate used in Example 1 and 4 parts of benzoyl peroxide were added over 5 hours to a refluxing mixture of equal parts by weight of toluene and light petroleum, B.P. 100–120° C. as in Example 1. There was thus obtained a copolymer of the composition indicated in Table 1.

A solvent-free polymer of the composition given in Table 1 was then obtained as described in Example 1.

Example 8

A solution of 50 parts of the methacrylate of methoxy-terminated polyethylene glycol referred to in Example 1 and 2 parts of benzoyl peroxide in 220 parts of toluene was heated under reflux for 17 hours. Additions of 0.5 part benzoyl peroxide were made 1.5, 2.5 and 4 hours respectively from the time of commencing reflux. The solvent free homopolymer was obtained as described in Example 1.

Example 9

A mixture of 212 parts of the fumaric acid diester of methoxy terminated polyethyleneglycol of molecular weight 320, 127 parts of lauryl methacrylate, 6 parts of benzoyl peroxide and 100 parts of toluene was added at a uniform rate over a period of 4 hours to a mixture of 200 parts benzene and 400 parts of toluene which was heated and stirred under reflux. The reaction was allowed to continue for 54 hours when 2 parts of benzoyl peroxide were added and heating under reflux was continued for a further 24 hours. The solvents were removed under reduced pressure. There was thus obtained a copolymer of the composition indicated in Table 1.

Example 10

The procedure of Example 1 was repeated except that 0.65 part of butan-1:3-diol dimethacrylate was included in the mixture of monomers polymerised. The resulting copolymer obtained by evaporation of the solvent was slightly cross-linked and had the composition given in Table 1.

Example 11

50 parts of the copolymer from Example 2 were stirred and heated at 80° C. under nitrogen whilst 40 parts of freshly distilled vinyl acetate containing 0.6 part of benzoyl peroxide were added dropwise over a period of 30 minutes. Stirring and heating to 90–100° C. under reflux were then continued for 3 hours. The mixture was allowed to cool to 20° C. after which all matter volatile up to 100° C. at 0.1 mm. Pressure was removed by distillation. There was thus obtained 85.7 parts of a homogeneous clear oil that set to a waxy solid on cooling.

TABLE I

| Monomer | Example Number ||||||||||
|---|---|---|---|---|---|---|---|---|---|---|
| | 1 | 2 | 3 | 4 | 5 | 6 | 7 | 8 | 9 | 10 |
| | Molar proportion of monomer ||||||||||
| Butyl methacrylate | 0.06 | 0.2 | 0.2 | | | | | | | 0.06 |
| Stearyl methacrylate | 0.3 | 0.4 | 0.2 | | | | | | | 0.3 |
| Methoxypolyethyleneglycol (M.W. 320) ester of methacrylic acid | 0.3 | 0.2 | 0.4 | 0.23 | 0.24 | 0.24 | 0.145 | [1]1 | | 0.3 |
| Ethyl acrylate | | | | 0.15 | 0.1 | 0.1 | 0.5 | | | |
| Lauryl methacrylate | | | | 0.37 | | | | | 0.50 | |
| 2-ethylhexyl acrylate | | | | | 0.54 | | | | | |
| Methoxypolyethyleneglycol (M.W. 320) diester of fumaric acid | | | | | | | | | 0.29 | |
| Butyl acrylate | | | | | | 0.78 | | | | |
| Butan-1:3-diol dimethacrylate | | | | | | | | | | 0.003 |

[1] Homopolymer.

Example 6

100 parts of the polyethyleneglycol methacrylate used for making polymer A, 100 parts of butyl acrylate and 10 parts of ethyl acrylate were copolymerised as in Example 3. There was thus obtined a copolymer of the composition indicated in Table 1.

Example 7

A mixture of 60 parts of the methacrylate of methoxy-terminated polyethyleneglycol referred to in Example 1, 50 parts of ethyl acrylate and 4 of benzoyl peroxide was added at a constant rate over a period of 5 hours to a stirred, refluxing mixture of 300 parts toluene and 100 parts of light petroleum (boiling point 100–120° C.). Heating under reflux was continued for a further 10 hours.

Example 12

A solution of 53 parts of di-n-octyl itaconate, 75 parts of the itaconate diester of methoxy-polyethylene glycol of molecular weight 320 and 1 part of azobisisobutyronitrile in 200 parts of benzene was heated under reflux with stirring. Additions of 1 part of azobisisobutyronitrile each were made after periods of 6, 24, 48 and 72 hours respectively from the start of the experiment; the total period of heating under reflux was 96 hours. The solvent was stripped from the solution by distillation under reduced pressure.

Example 13

A solution of 1 part of azobisisobutyronitrile in 66 parts of 2-ethoxyethyl methacrylate and 42 parts of lauryl methacrylate was added dropwise over a period of one hour to a stirred mixture of 100 parts of benzene and 100 parts of toluene heated under reflux. Heating and stirring were continued for a further 19 hours when a determination of the solids conent of the solution showed that the polymerisation had gone beyond 95% completion. The solvent-free copolymer was obtained as described above.

Example 14

A solution of 53.5 parts of the methacrylate of methoxy polyethylene glycol of molecular weight 1300 (hereinafter referred to as polymer O) and 2 parts benzoyl peroxide in 46.5 parts butyl acrylate, 80 parts of butanol and 25 parts of "Cellosolve" acetate (registered trademark) was added at a uniform rate during 5 hours to a stirred refluxing mixture of 200 parts butanol and 95 parts "Cellosolve" acetate. Then one further part of benzoyl peroxide was added and the heating under reflux was continued for another 11 hours. The solvents were removed under reduced pressure.

Example 15

A solution of 42 parts of polymer O and 2 parts of benzoyl peroxide in 37.2 parts of ethyl acrylate, 80 parts of butanol and 70 parts of Cellosolve acetate was added at a uniform rate over a period of 5 hours to a stirred refluxing mixture of 160 parts butanol and 95 parts of Cellosolve acetate. A further 1.5 parts of benzoyl peroxide was added 1.5 hours after the monomer feed was completed and heating under reflux was continued for 7 hours; total reaction time was 13.5 hours. The polymeric stabiliser was freed of solvent as described above.

Example 16

A solution of 61 parts of polymer O, 41 parts of stearyl methacrylate and 2 parts benzoyl peroxide in 100 parts of Cellosolve acetate, 10 parts of butanol, 20 parts of toluene and 20 parts of petroleum ether (B.P. 100–120° C.) was added at a uniform rate over one hour to 200 parts of butanol stirred and heated under reflux. Three hours after the addition was complete 1 part of benzoyl peroxide was added, and heating under reflux was continued for a further 16 hours. Solvent was then stripped from the polymer as described above.

Example 17

A solution of 61 parts of polymer O, 39 parts of lauryl methacrylate and 2.5 parts of benzoyl peroxide in 100 parts of Cellosolve acetate, 10 parts of butanol, 20 parts of toluene and 20 parts of petroleum ether was added at a uniform rate over a period of one hour to 200 parts of butanol stirred and heated under reflux. One part of benzoyl peroxide was added 3 hours after the original feed had finished and heating under reflux was continued for a further 16 hours. The polymer was obtained free of solvent as described in the earlier examples.

Example 18

3.5 mole of ethylene oxide and 2.5 mole of propylene oxide were mixed and condensed onto 1 mole of n-butanol in the presence of sodium hydroxide catalyst, and the resulting polyether alcohol was converted to its methacrylate ester by the process of Example No. 7 of U.S. patent specification No. 2,815,369. 63 parts of this methacrylate, 32.4 parts of stearyl acrylate, 4 parts of ethyl acrylate and 2 parts of benzoyl peroxide were mixed to form a homogeneous solution, and the resulting mixture added at a constant rate over 4 hours to a stirred refluxing mixture of 200 parts of toluene and 200 parts of petroleum ether (B.P. 100–120° C.). One further part of benzoyl peroxide was then added and heating under reflux was continued for 16 hours. Determination of the solids content of the resulting solution showed that a 95% yield of polymer had been obtained. The solvent-free polymer was then isolated as above described.

Example 19

A solution of 2.5 parts benzoyl peroxide in 61 parts of the methacrylate of methoxypolyethyleneglycol of molecular weight 320, and 41 parts of lauryl methacrylate in a mixture of 20 parts of toluene, 20 parts of petroleum ether (B.P. 100–120° C.), 15 parts of butyl acetate and 15 parts of butanol was added at a uniform rate over a period of one hour to a stirred refluxing mixture of 100 parts of petroleum ether (B.P. 100–120° C.) and 100 parts of toluene. 3 hours after the addition had been completed, 1 part of benzoyl peroxide was added and the heating under reflux continued for 16 hours. The polymeric stabiliser was obtained solvent-free in the manner described in earlier examples.

Example 20

A solution of 2.5 parts benzoyl peroxide, 71 parts of the methacrylate of methoxypolyethyleneglycol of molecular weight 320, and 42 parts of stearyl methacrylate in 50 parts of toluene and 20 parts of petroleum ether (B.P. 100–120° C.) and 10 parts of butanol was added over a period of one hour to a mixture of 100 parts of toluene and 100 parts of petroleum ether (B.P. 100–120° C.) stirred and heated under reflux. An addition of benzoyl peroxide was made and the polymerisation was completed as described in Example 19.

Example 21

130 parts of itaconic acid, 260 parts of methoxypolyethyleneglycol of molecular weight 320, 192 parts of n-octanol, 15 parts of para-toluenesulphonic acid and 1500 parts of toluene were charged into a glass reaction vessel fitted with a stirrer, Dean and Stark trap and condenser. The reactants were heated and stirred under reflux for 36 hours; the water formed in the esterification was removed by means of the Dean and Stark apparatus. The contents of the reactor were allowed to cool to ambient temperature and washed in turn with 100 parts of 50% (w./w.) aqueous sodium hydroxide solution, and with 2 portions each of 200 parts of a saturated solution of sodium chloride in water. The resulting solution was stirred with anhydrous sodium sulphate, decanted from the solid, and freed of toluene by distillation under reduced pressure to yield the mixed ester as a viscous liquid.

A solution of 100 parts of this mixed itaconate ester and 2 parts azobisisobutyronitrile in 200 parts of benzene was heated under reflux. Additions of 1 part of azobisisobutyronitrile each were made at 4, 8, 24, 28, 32, 48, 52 and 56 hours respectively after the start of the experiment; the total time of heating the mixture was 72 hours. The solvent-free polymer was then obtained as described in the earlier examples.

Example 22

A solution of 52 parts of di-Cellosolve fumarate, 51 parts of lauryl methacrylate and 1 part of azobisisobutyronitrile in 100 parts of toluene and 100 parts of petroleum ether (B.P. 100–120° C.) was heated under reflux. Additions, each of 0.5 part of azobisisobutyronitrile were made 2, 4, 6, 8, 10 and 23 hours respectively after start of the polymerisation, the total reaction time being 26 hours. The resulting solution was heated (up to 120° C.) under reduced pressure (0.05 mm. mercury) to give a high yield of the copolymer.

Example 23

A suspension of 71.5 parts of itaconic acid in 500 parts of toluene containing 5 parts of p-toluenesulphonic acid was esterified with a mixture of 178 parts of lauryl alcohol and 178 parts of methoxypolyethyleneglycol of molecular weight 1300 as described in Example 21.

A solution of 100 parts of this mixed ester and 2 parts of azobisisobutyronitrile in 200 parts of benzene was heated under reflux with stirring. Additions of 1 part of azobisisobutyronitrile were made as in Example 12 and again the total period of heating under reflux was 96 hours. The polymeric product was obtained solvent-free as described in the earlier examples.

Example 24

A mixture of 11.2 parts of itaconic anhydride, 26.9 parts of dinonylamine and 150 parts of toluene was warmed at about 50° C. for 10 minutes in a glass reactor fitted with a stirrer and reflux condenser. Then 27 parts of stearyl alcohol and 1 part of paratoluenesulphonic acid were added and the reactor was fitted with a Dean and Stark apparatus. Stirring and heating under reflux were resumed and continued for 2 hours with continuous removal of the water of reaction via the Dean and Stark apparatus. The contents of the reactor were cooled to ambient temperature, washed in succession with 20 parts of 10% w./w. aqueous sodium hydroxide solution, 20 parts of water, and 2 portions each of 25 parts of saturated aqueous sodium chloride solution. The toluene was removed from the esteramide by distillation under reduced pressure.

A solution of 50 parts of this esteramide, 1 part of azobisisobutyronitrile and 50 parts of the itaconic acid diester of methoxypolyethyleneglycol of molecular weight 320 in 200 parts of benzene was heated under reflux with stirring. Additions of 1 part of azobisisobutyronitrile each were made 4, 8, 24, 28, 32, 48, 52 and 56 hours respectively after the start of the experiment; the total time of heating the mixture was 72 hours. The solvent-free-polymeric pore size control agent was obtained as described in the earlier experiments.

Example 25

A mixture of 154 parts of ethylene oxide and 145 parts of propylene oxide was condensed onto 74 parts of n-butanol in the presence of sodium hydroxide catalyst. A glass reactor fitted with a Dean and Stark apparatus, reflux condenser and stirrer was used for the next part of the experiment. 65 parts of itaconic acid, 93 parts of the polyether alcohol described above in this example, 139.5 parts of lauryl alcohol, 10 parts of para-toluene-sulphonic acid and 1500 parts of toluene were charged into the reactor and heated and stirred under reflux for 14 hours with continuous removal of water via the Dean and Stark apparatus. The contents of the reactor were allowed to cool, washed with 50 parts of a 50% w./w. solution of caustic soda, 100 parts of saturated brine, and then allowed to stand over 100 parts of anhydrous sodium sulphate. The resulting solution was decanted from the solid, and the ester product was obtained after the toluene had been removed under reduced pressure.

A solution of 100 parts of this mixed itaconic acid ester and 2 parts of azobisisobutyronitrile in 200 parts of benzene was heated under reflux. The polymerisation was completed and additions of azobisisobutyronitrile were made as in Example 21. 50 parts of this polymer of the mixed itaconic acid ester were stirred and heated at 80° C. under nitrogen whilst a solution of 0.5 part of benzoyl peroxide in 30 parts of Cellosolve methacrylate and 5 parts of methyl methacrylate was added dropwise over a period of 30 minutes. Stirring and heating to 90–100° C. under reflux were then continued for 3 hours. The mixture was allowed to cool to 20° C. after which all matter volatile up to 100° C. at 0.1 mm. mercury pressure was removed by distillation. There was thus obtained 80 parts of a homogeneous clear oil that set to a waxy solid on cooling.

Example 26

A solution of 1.5 parts of benzoyl peroxide and 67 parts of the acrylate of the alcohol formed by condensing nine moles of ethylene oxide onto 1 mole of para-nonylphenol in 14 parts of butyl acrylate, 75 parts of benzene and 75 parts of toluene was stirred and heated under reflux. Portions of 0.5 part of benzoyl peroxide were added 2 and 4 hours respectively after the start of the polymerisation, which was allowed to proceed for a total of 6 hours. The solvents were removed under reduced pressure as in earlier examples.

The following examples illustrate the use of the polymeric stabilisers in conjunction with relatively low levels of blowing agent.

Example 27

A foaming composition containing the following ingredients in the proportions stated (by weight) was prepared:

| | Parts |
|---|---|
| "Corvic" P65/54, polyvinyl chloride resin (registered trademark, ICI) | 100 |
| Diisooctyl phthalate | 80 |
| "Celogen" AZ (registered trademark, Naugatuck, Conn. Chemical Company, a type of azobiscarbonamide blowing agent) | 0.66 |
| Dibasic lead phthalate | 5 |
| Dry pigment (1 part of "Chromophthal GR," registered trademark, Ciba, mixed with 13.5 parts of calcium carbonate) | 5 |
| Polymeric stabiliser from Example 1 | 2 |

The 0.66 part of blowing agent, the 5 parts of dibasic lead phthalate and 5 parts of pigment were combined with 15 parts of the diisooctyl phthalate and passed twice through a triple roll mill at room temperature to ensure uniform dispersion of these insoluble solids in the plasticiser. The 2 parts of stabiliser were dissolved in the remaining 65 parts of plasticiser, and this solution was combined with the above-described dispersion of solids in diisooctyl phthalate. The "Corvic" P65/54 resin was then added to this blend of ingredients with stirring to form the plastisol which was then passed twice through a triple roll mill at room temperature to produce a uniform distribution of the suspended solids in the plasticiser.

A Gardner spreader (made by Gardner Laboratories Inc., Bethesda, Md., U.S.A.) fitted with an adjustable doctor knife was used to spread the plastisol onto silicone-treated release paper ("Stripkote" made by S. D. Warren Co., Boston, Mass., U.S.A.); the gap on the spreading blade was set at 0.015 inch. The paper coated with plastisol was placed in an air-circulating oven at 130° C. for 2 minutes to gel the film which was found to be 0.010 inch thick on cooling.

An adhesive plastisol composition was made up in a manner analogous to that used for the foaming composition except that the pigment and blowing agent was omitted. A coating 0.001–0.002 inch thick of this adhesive composition was spread over the gelled film of the foaming composition with the Gardner spreader. A backing cloth was then applied to the adhesive coating with the aid of a rubber roller. This complex laminate was attached to a frame which was then placed in an air-circulating oven at 232° C. for 4 minutes; in this procedure the laminated specimen was held in a horizontal position with the cloth uppermost. After the sample cooled to room temperature, the paper was easily stripped off, leaving behind a coating of foamed plasticised polyvinyl chloride film laminated to the cloth. Sections of the foamed layer were examined. The cells constituting the foam were remarkable for their uniformly small size.

Example 28

The procedure of Example 27 was repeated except that the polymeric stabiliser was omitted. The foamed laminate produced appeared similar to that of Example 27 but on close examination, the cells forming the foam were seen to be non-uniform in size and shape and highly irregular when compared with the foam of Example 27.

This foaming composition made without the polymeric additive had a higher viscosity (determined with the Brookfield Viscometer) than that made in Example 27.

Examples 29–43 inclusive

The procedure of Example 27 was repeated except that the copolymeric stabiliser described in Example 1 was replaced with an equal quantity of one of the stabilisers produced in Examples 2–26 inclusive. The stabilisers chosen and the corresponding examples are set out in Table II. In each of these experiments, except for experiment 32, a foamed laminate was produced which was comparable in uniformity of texture, flexibility and pore size to the foam of Example 27. The viscosities of these blowing compositions, except that of experiment 32, were lower than that of the plastisol of Example 28 made without an additive according to this invention.

TABLE II

| Example No. (foaming experiment): | Stabiliser used from Example No. |
|---|---|
| 29 | 4 |
| 30 | 5 |
| 31 | 6 |
| 32 | 7 |
| 33 | 9 |
| 34 | 11 |
| 35 | 13 |
| 36 | 14 |
| 37 | 17 |
| 38 | 18 |
| 39 | 20 |
| 40 | 22 |
| 41 | 23 |
| 42 | 25 |
| 43 | 26 |

Example 44

A foaming composition was made up from the following ingredients in the proportions stated (by weight):

| | Parts |
|---|---|
| "Geon" 120 x 174, polyvinyl chloride resin (registered trademark, B. F. Goodrich Co.) | 100 |
| Diisooctyl phthalate | 75 |
| Calcium carbonate | 25 |
| "Celogen" AZ, blowing agent | 8 |
| Dibasic lead phthalate | 12 |
| Stabiliser made as described in Example 1 | 1 |

The 25 parts of calcium carbonate, the 8 parts of "Celogen" AZ and 12 parts of dibasic lead phthalate were mixed with 50 parts of the plasticiser, and the mixture passed twice through a triple roll mill at room temperature. A solution of the 1 part of the stabiliser described in Example 1 in the remaining 25 parts of diisooctyl phthalate was added to the dispersion of the insoluble solids in plasticiser, and followed by the 100 parts of "Geon" 120 x 174 resin. The resulting mixture was passed through a triple roll mill at room temperature to produce the plastisol foaming composition with a uniform distribution of the suspended solid particles in the plasticiser.

The Gardner spreader with the adjustable doctor knife set to a gap of 0.020 inch was used to spread this plastisol onto the silicone-treated release paper described in Example 27. The paper used was 8 inches wide by 12 inches long; the spread coating was 6 inches by 11 inches. The spread film was gelled in an air-circulating oven at 130° C. for two minutes. The coated paper was cut into test pieces 1.25 inches wide by 8 inches long, each piece carrying a gelled film 1.25 inches by 6 inches. One of these test pieces was placed in an air-circulating oven at 200° C. for 4 minutes. The foam produced had a smooth surface, and inspection of several cross sections showed that its cell structure was highly uniform.

Example 45

The preparation of test pieces from a foaming composition was repeated as in Example 44 except that the stabiliser was omitted from the foaming composition. One of the test pieces was placed in an air-circulating oven at 200° C. for 4 minutes. The foam produced did not have as smooth a surface as that of the previous example, and the cell structure was not as uniform.

Example 46

One test piece as described in Example 44 and one as in Example 45 were placed in an air-circulating oven at 210° C. for 4 minutes. The former produced a foamed strip that had a smoother surface and consisted of cells of smaller and more uniform size than the latter.

Examples 47–64 inclusive

Foaming compositions were made as described in Example 44, with the exception that the copolymer of Example 1 was replaced with copolymers chosen from Examples 2–26 inclusive. The copolymers used in these examples are set out in Table III. Test pieces for the production of foamed plasticised polyvinyl chloride were prepared from these compositions as described in Example 44, and these test pieces were converted into foams in an oven at 200° C. as in that example. The foams of Examples 52, 53 and 58 were markedly inferior; they had a rough uneven surface and consisted of relatively large cells of variable size and shape. The remaining foams in this series of Examples 47–64 inclusive were of good quality and of uniformity equal to that of Example 44.

TABLE III

| Example No. (foaming experiment): | Stabiliser used from Example No. |
|---|---|
| 47 | 2 |
| 48 | 3 |
| 49 | 4 |
| 50 | 5 |
| 51 | 6 |
| 52 | 7 |
| 53 | 8 |
| 54 | 10 |
| 55 | 12 |
| 56 | 13 |
| 57 | 14 |
| 58 | 15 |
| 59 | 16 |
| 60 | 17 |
| 61 | 19 |
| 62 | 21 |
| 63 | 24 |
| 64 | 26 |

Examples 65–69 inclusive

Test pieces as prepared in Examples 47–51 inclusive were place in an air-circulating oven at 210° C. for 4 minutes. As in Example 46 the incorporation of one of the polymeric additives of this invention produced a more uniform cellular product at this higher temperature than a control sample treated in the same manner without the additive, as described in Example 46.

Example 70

A foamed plasticised polyvinyl chloride film was produced as in Example 45 except that "Corvic" P65/55 (registered trademark, ICI) was the resin employed.

Examples 71–77 inclusive

Foaming compositions were prepared as in Example 44 except that the polyvinyl chloride resin was "Corvic" P65/55 (registered trademark, ICI) throughout and that the copolymers of Example 1–6 inclusive and Example 26 were used for these examples respectively. Test pieces as described in Example 44 were prepared from these foaming compositions and converted into foamed polyvinyl chloride in an oven at 200° C. as therein described.

The cellular polymers of the Examples 71–77 inclusive were superior to that of Example 60 made without the aid of our polymeric additives.

Example 78

A solution of 36.5 parts of the diester of methoxypolyethylene glycol (molecular weight 320) with fumaric acid in a mixture of 100 parts toluene and 100 parts methyl ethyl ketone was heated and stirred under reflux. A solution of 31 parts of vinyl stearate, 8.6 parts of vinyl acetate and 1 part of azobisisobutyronitrile in 50 parts of methyl ethyl ketone was added at a uniform rate over a period of four hours to the above solution heated under reflux. When the addition was complete further 0.2 part of azobisisobutyronitrile was added to the reaction mixture and heating and stirring under reflux were continued for a further four hours. The solvent-free polymer was then isolated by the procedure described in Example 1.

Example 79

800 parts of propylene oxide were condensed onto 190 parts of 2-ethoxyethanol in the presence of sodium hydroxide catalyst and the resulting polyether alcohol was converted to its methacrylate ester by the process of Example 7 of U.S. patent specification No. 2,815,369. A solution of 132.5 parts of this methacrylate ester and 3 parts of benzoyl peroxide in 71 parts of butyl methacrylate and 6 parts of dodecyl mercaptan was added at a uniform rate over a 1.5 hours period to 620 parts of isopropanol which was heated and stirred under reflux throughout this period. When this addition was complete, 0.2 part of benzoyl peroxide were added and heating and stirring under reflux was continued for 10 hours with further quantities of 0.2 part of benzoyl peroxide being introduced at 2.5 hourly intervals. The solvent-free polymer was then obtained as in Example 1.

Example 80

A copolymer of 159 parts of the polyether methacrylate described in Example 57, 101.4 parts of stearyl methacrylate and 7.6 parts of butyl acrylate was prepared by the process described in Example 1.

Example 81

The process of Example 36 was repeated except that only 43 parts of the methacrylate of the polyether alcohol were used in making the copolymer; the quantities of the other reactants remained unchanged. The polymer was isolated as described in Example 36.

Example 82

A solution of 33 parts of allyl lauryl prop-2-enyl-phosphonate and 30.3 parts of the methacrylate of diethylene glycol monoethyl ether in 60 parts of beta, beta'-dichlorodiethyl ether containing 1.5 parts of di-tert.butyl peroxide was heated for 8 hours at 150° C. Additions of 0.5 part of the peroxide to the reaction mixture were made at 2 hourly intervals. The solvent-free polymer was obtained as in Example 1.

Example 83

A solution of 3.6 parts of azobisisobutyronitrile in 170.4 parts of isobutyl methacrylate and 193 parts of the methacrylate of methoxypolyethylene glycol of molecular weight 320 was added at a uniform rate over a period of 2.5 hours to a mixture of 500 parts of light petroleum B.P. 100–120° C. being heated under reflux. Portions of 0.5 and 0.2 part of azobisisobutyronitrile were added 5 hours and 7 hours respectively from the start of the experiment. The heating under reflux was maintained for 24 hours in all. The solvent-free polymer was obtained as in Example 1.

Examples 84–89 inclusive

Foaming compositions were prepared as in Example 44 except that the copolymer of Examples 78–83 inclusive respectively were used. Test pieces were prepared from these foaming compositions and converted into foamed polyvinyl chloride in an oven at 200° C. and as described in Example 44.

The cellular polymer of Examples 84 to 89 inclusive were superior to that of Example 60 made without the aid of our polymeric surfactants.

I claim:
1. In a process of foaming a polymer of vinyl chloride selected from the group consisting of homopolymers of vinyl chloride and copolymers of vinyl chloride containing at least 50% vinyl chloride with an ethylenically unsaturated monomer copolymerizable therewith, the improvement comprising foaming said polymer in the presence of a pore-size controlling additive comprising at least one copolymer of
   (1) at least one compound A selected from the class consisting of esters and dialkylamides of acrylic, methacrylic, itaconic and crotonic acids and
   (2) at least one compound B selected from the class consisting of esters and dialkylamides of mono- and di-carboxylic unsaturated acids selected from the class consisting of acrylic, methacrylic, maleic, fumarric, citraconic and mesaconic acids,
   at least one of said compounds A and B carrying at least one aliphatic substituent having at least 4 carbon atoms and said compound B containing at least one polyoxyalkylene residue terminated with a radical selected from the class consisting of alkyl, aryl, aralkyl, alkaryl and acyl groups.

2. A process according to claim 1 wherein said aliphatic substituent is a long chain alkyl radical having at least 12 carbon atoms in the chain.

3. A process according to claim 2 wherein the weight of the long chain alkyl radical is between 10 and 60% of the total weight of the pore-size controlling additive.

4. A process according to claim 1 wherein the weight of the polyoxyalkylene residue is between 15 and 70% of the total weight of the pore-size controlling additive.

5. A process according to claim 1 wherein in addition to compounds A and B, the pore-size controlling additive comprises at least one copolymerizable ethylenically unsaturated co-mer in an amount up to 30 mole percent of the total copolymer.

6. In a process of foaming a polymer of vinyl chloride selected from the group consisting of homopolymers of vinyl chloride and copolymers of vinyl chloride containing at least 50% vinyl chloride with an ethylenically unsaturated monomer copolymerizable therewith, the improvement comprising foaming said polymer in the presence of a pore-size controlling additive comprising at least one copolymer of
   (1) a compound A selected from the class consisting of vinyl esters of an alkanoic acid and esters and dialkylamides of a monocarboxylic acid selected from the class consisting of acrylic and methacrylic acids and diesters, esterdialkylamides, tetraalkyldiamides and cyclic N-carboximides of itaconic acid,
   (2) a compound B selected from the class consisting of esters and dialkylamides of a monocarboxylic acid selected from the class consisting of esters and dialkylamides of a monocarboxylic acid selected from the class consisting of acrylic and methacrylic acids and diesters, esterdialkylamides, tetraalkyldiamides and cyclic N-alkylcarboximides of a dicarboxylic acid selected from the class consisting of maleic, fumaric and itaconic acids,
   (3) a compound C selected from the class consisting of acrylic and methacrylic acids and vinyl esters of lower alkanoic acids having 2–4 carbon atoms,
   at least one of said compounds A and B carrying at least one alkyl group $R^1$ having at least 4 carbon atoms, said compound B carrying a substituent of the formula —$ZXR^{10}$ wherein Z is selected from the class consisting of linear or branched copolymer, random copolymer or block copolymer polyoxyalkylene residues, X is selected from the class consisting of —O— and NR$^{18}$ wherein R$^{18}$ is a hydrocarbon radical and R$^{10}$ is selected from the class consisting of alkyl, cycloalkyl, aryl, alkaryl, aralkyl and acyl groups, the weight of said alkyl group R$^1$ being between 10 and 60% of the weight of the pore-size controlling additive, the weight of Z in said polyoxyalkylene residue being between 15 and 70% of the weight of said pore-size controlling additive and the compound C being present in an amount up to 30 mole percent of the total copolymer.

References Cited

UNITED STATES PATENTS

| | | | |
|---|---|---|---|
| 2,964,799 | 12/1960 | Roggi et al. | 260—2.5 |
| 3,247,289 | 4/1966 | Sears | 260—885 |

MURRAY TILLMAN, *Primary Examiner.*

MORTON FOELAK, *Assistant Examiner.*

U.S. Cl. X.R.

260—896, 897, 899, 901

UNITED STATES PATENT OFFICE
CERTIFICATE OF CORRECTION

Patent No. 3,454,507                                          July 8, 1969

David Jankiel Wluka

It is certified that error appears in the above identified patent and that said Letters Patent are hereby corrected as shown below:

In the heading to the printed specification, between lines 9 and 10, insert the following:

Claims priority, application Australia, Oct. 25, 1965, 65,670/65

Signed and sealed this 21st day of April 1970.

(SEAL)
Attest:

Edward M. Fletcher, Jr.                                 WILLIAM E. SCHUYLER, JR.
Attesting Officer                                            Commissioner of Patents